(12) United States Patent
Zhang et al.

(10) Patent No.: US 8,108,374 B2
(45) Date of Patent: Jan. 31, 2012

(54) OPTIMIZATION FRAMEWORK FOR TUNING RANKING ENGINE

(75) Inventors: Ruofei Zhang, San Jose, CA (US); Jianchang Mao, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 651 days.

(21) Appl. No.: 12/211,307

(22) Filed: Sep. 16, 2008

(65) Prior Publication Data

US 2010/0070498 A1    Mar. 18, 2010

(51) Int. Cl.
G06F 17/30    (2006.01)

(52) U.S. Cl. ........ 707/705; 707/706; 707/748; 707/723; 707/852

(58) Field of Classification Search .................. None
See application file for complete search history.

(56) References Cited

U.S. PATENT DOCUMENTS

| | | | |
|---|---|---|---|
| 7,243,102 B1 * | 7/2007 | Naam et al. ..................... 1/1 |
| 7,725,465 B2 * | 5/2010 | Liao et al. ..................... 707/728 |
| 7,849,042 B2 * | 12/2010 | Yaojie et al. ..................... 706/46 |
| 7,996,392 B2 * | 8/2011 | Liao et al. ..................... 707/723 |
| 8,010,535 B2 * | 8/2011 | Taylor et al. ..................... 707/748 |

OTHER PUBLICATIONS

Chakrabarti et al., "Contextual Advertising by Combining Relevance with Click Feedback", WWW2008/Refereed Track: Search—Ranking & Retrieval Enhancement Apr. 21-25, 2008, Beijing, China, downloaded on Aug. 21, 2008.

Nigam et al., "Using Maximum Entropy for Text Classification", School of Computer Science, Carnegie Mellon University, Pittsburgh, Pennsylvania, downloaded on Aug. 21, 2008.

Joachims, T., "Optimizing Search Engines using Clickthrough Data", Cornell University, Department of Computer Science, Ithaca, New York, downloaded on Sep. 16, 2008.

Trotman, A., "Choosing Document Structure Weights", Department of Computer Science, University of Otago, Dunedin, New Zealand, downloaded on Aug. 21, 2008.

Rapela, J., "Automatically Combining Ranking Heuristics for HTML Documents", WIDM 2001, Atlanta, Georgia, pp. 61-67, downloaded on Aug. 21, 2008.

"Okapi BM25", http://en.wikipedia.org/wiki/Probablisstic_revelance_model_(BM25), printed Aug. 21, 2008, downloaded on Aug. 21, 2008.

(Continued)

*Primary Examiner* — Baoquoc To
(74) *Attorney, Agent, or Firm* — Weaver Austin Villeneuve & Sampson LLP

(57) ABSTRACT

Disclosed are apparatus and methods for facilitating the ranking of web objects. The method includes automatically adjusting a plurality of weight values for a plurality of parameters for inputting into a ranking engine that is adapted to rank a plurality of web objects based on such weight values and their corresponding parameters. The adjusted weight values are provided to the ranking engine so as to generate a ranked set of web objects based on such adjusted weight values and their corresponding parameters, as well as a particular query. A relevance metric (e.g., that quantifies or qualifies how relevant the generated ranked set of web objects are for the particular query) is determined. The method includes automatically repeating the operations of adjusting the weight values, providing the adjusted weight values to the ranking engine, and determining a relevance metric until the relevance metric reaches an optimized level, which corresponds to an optimized set of weight values. The repeated operations utilize one or more sets of weight values including at least one set that results in a worst relevance metric value, as compared to a previous set of weight values, according to a certain probability in order to escape local optimal solution to reach the global optimal solution.

18 Claims, 6 Drawing Sheets

OTHER PUBLICATIONS

Boyan et al., "A Machine Learning Architecture for Optimizing Web Search Engines", School of Computer Science, Carnegie Mellon University, May 10, 1996, downloaded on Aug. 21, 2008.

"Simplex algorithm", http://en.wikipedia.org/wiki/Simplex_algorithm, printed Aug. 25, 2008.

"Simulated annealing", http://en.wikipedia.org/wiki/Simulataed_annealing, printed Sep. 5, 2008.

Taylor et al., "Optimisation methods for ranking functions with multiple parameters"CIKM'06, Nov. 5-11, 2006, Arlington, Virginia, downloaded on Aug. 21, 2008.

* cited by examiner

OPTIMIZATION FRAMEWORK FOR TUNING RANKING ENGINE

BACKGROUND OF THE INVENTION

The present invention is related to techniques and mechanisms for ranking a plurality of web objects, such as web documents or advertisements.

In recent years, the Internet has been a main source of information for millions of users. These users rely on the Internet to search for information of interest to them. One conventional way for users to search for information is to initiate a search term query through a search service's web page. Typically, a user can enter one or more search term(s) into an input box on the search web page and then initiate a search based on such entered search term(s). In response to a search term query, a ranking engine generally returns a ranked list of search result documents. In another ranking application, a query may pertain to a particular web document and a ranking engine is operable to locate a ranked list of advertisement links or pages that are relevant for such queried web document.

In most web page and advertisement ranking systems, there are a large number of parameters which have a significant impact on the objective metrics that are used by the ranking engine. Typically the parameters are tuned manually by domain experts and tune-and-test experiments. The overhead is very high and the time needed for the numerous manual tuning iterations is very long although optimal parameters are not always found. Moreover, the objective metrics to be optimized are typically changed in different use cases and scenarios.

Accordingly, it would be beneficial to provide improved mechanisms for tuning parameters for ranking mechanisms.

SUMMARY OF THE INVENTION

Accordingly, apparatus and methods for facilitating the ranking of a plurality of web objects are disclosed. In one embodiment, a method includes automatically adjusting a plurality of weight values for a plurality of parameters for inputting into a ranking engine that is adapted to rank a plurality of web objects based on such weight values and their corresponding parameters. The adjusted weight values are provided to the ranking engine so as to generate a ranked set of web objects based on such adjusted weight values and their corresponding parameters, as well as a particular query. A relevance metric (e.g., that quantifies or qualifies how relevant the generated ranked set of web objects are for the particular query) is determined. The method includes automatically repeating the operations of adjusting the weight values, providing the adjusted weight values to the ranking engine, and determining a relevance metric until the relevance metric reaches an optimized level, which corresponds to an optimized set of weight values. The repeated operations utilize one or more sets of weight values including at least one set that results in a worst relevance metric value, as compared to a previous set of weight values, according to a certain probability in order to escape local optimal solution to reach the global optimal solution.

In a specific implementation, the operation of automatically repeating the operations for adjusting the weights, providing the adjusted weight values, and determining a relevance metric is accomplished by (i) generating a N+1 vertex simplex, wherein N corresponds to the number of parameters for which weight values are to be adjusted and (ii) transforming the simplex by a reflecting, expanding, and/or contracting operation on one or more vertices of the simplex whereby the transformed simplex's resulting vertices correspond to the adjusted weight values that are provided to the ranking engine. In this implementation, the transforming of the simplex is dependent on a variable temperature, which decreases for one or more transformation operations based on a simulated annealing technique, so that the probability that the adjusted weight values results in a lower relevance metric is inversely proportional to a current temperature value of the variable temperature. In a further embodiment, the transforming operation is performed by a modified Nelder-Mead technique that includes a positive, logarithmically distributed random variable, proportional to the current temperature value, within each stored function value that is associated with each vertex of the simplex, and a similar random variable that is subtracted from the function value of every new point of the simplex.

In yet another embodiment, the query includes one or more keywords and the ranking engine is adapted to locate web objects that are most relevantly associated with such keywords. In another application, the query includes a web page and the ranking engine is adapted to locate web objects in the form of advertisement objects that are most relevantly associated with such web page. In a specific implementation, the relevance metric is a normalized discounted cumulated gain (nDCG) value or a mean average precision (MAP) value.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1:
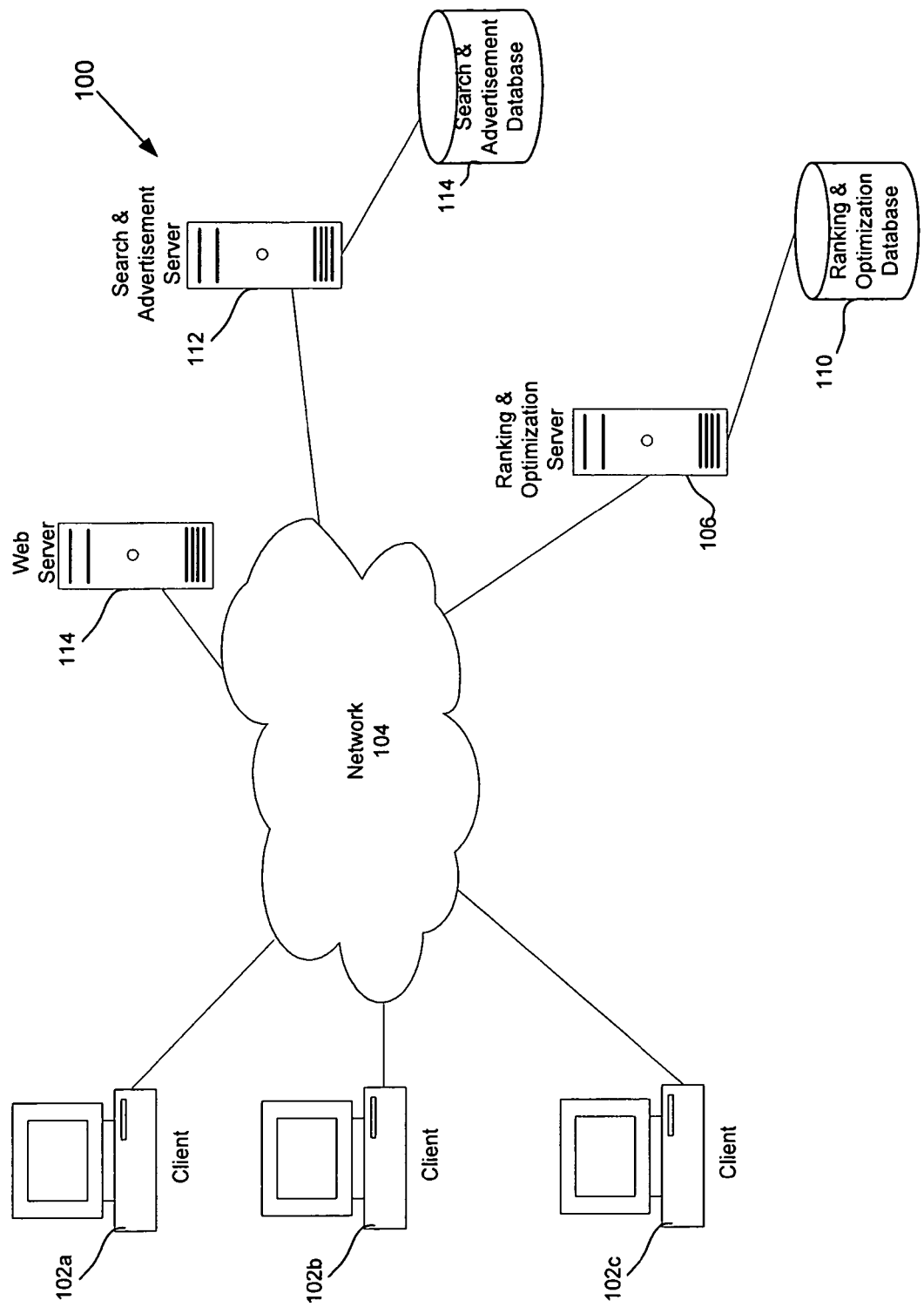
FIG. 1 illustrates an example network segment in which the present invention may be implemented in accordance with one embodiment of the present invention.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In certain embodiments, a very flexible stochastic optimization framework and system has been developed. The optimization system operates to automatically find the optimal parameter weight values for a ranking engine that ranks web objects, such as ranking relevant web pages for a search term query or ranking relevant advertisement links for a web page query. In one example framework, the system includes an optimization engine that integrates a simulated annealing and Nelder-Mead method. In this embodiment, the system implements a simulated annealing meta algorithm in which a parameter weight values search operation at each temperature applies a Nelder-Mead method. In a specific implementation, an N+1 vertex simplex is constructed for each move of the parameter weight values, and a Nelder-Mead method may generally be adapted to replace the worst point with a point reflected through a centroid of the remaining N points. If this point is better than the best current point, then this point can be stretched exponentially out along this line. On the other hand, if this new point is not much better than the previous value, then the point may be stepping across a non-optimized valley, so the simplex can be shrunk towards the best point. The developed optimization may include a number of advantages including desirable global optimization capability with relatively fast convergence and high flexibility. Thus, such an optimization can be applied to many systems and problems with minimal effort.

Although certain embodiments are described herein in relation to a ranking engine for ranking web objects in the context of a general web search application or an advertisement application, it should be apparent that a ranking optimization system may also be provided for other applications, such as a music or video service for browsing or searching through audio visual objects. It should also be noted that embodiments of the invention are contemplated in which the operation of the underlying ranking engine is largely unaffected by the overlying parameter weights optimization system, except for utilizing the optimized parameter weights. That is, in response to a query, the ranking engine may acquire information relating to the query as it would conventionally, except by utilizing an optimized set of parameter weights. In alternative embodiments, the ranking algorithm may be adjusted or altered based on the optimized set of parameter weights.

Prior to describing mechanisms for ranking parameters optimization, a computer network architecture will first be briefly described to provide an example context for practicing techniques of the present invention. FIG. 1 illustrates an example network segment 100 in which the present invention may be implemented in accordance with one embodiment of the present invention. As shown, a plurality of clients 102 may access a search application, for example, on search and advertisement server 112 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and forwarding search or web results back to the requesting clients or for forwarding data between various servers.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The search and advertisement server 112 may implement a search and/or an advertisement application. A search application generally allows a user (human or automated entity) to search for web objects (i.e., web documents, videos, images, etc.) that are accessible via network 104 and related to one or more search terms. In one search application, search terms may be entered by a user in any manner. For example, the search application may present a web page having any input mechanism to the client (e.g., on the client's device) so the client can enter a query having one or more search term(s). In a specific implementation, the search application presents a text input box into which a user may type any number of search terms.

In an advertisement application, a user (human or automated entity) can search for advertisements that are relevant for a particular web object, such as a specified web page. That is, a user submits a query that specifies a particular web object. In one implementation, a user enters an identification of a particular web object, e.g., a (universal resource locator) URL for a particular web page, via an input mechanism, such as a text input box.

Embodiments of the present invention may be employed with respect to any search and/or advertisement application, and example search and advertisement applications include Yahoo! Search, Google, Altavista, Ask Jeeves, etc. The search and/or advertisement applications may be implemented on any number of servers although only a single search and advertisement server 112 is illustrated for clarity and simplification of the description.

When a search or advertisement query is initiated to a search and advertisement server 112, such server then obtains a plurality of web objects that relate to the query input. In a search application, these web objects can be found via any number of servers (e.g., web server 114) and usually enter the search and advertisement server 112 via a crawling and indexing pipeline possibly performed by a different set of computers (not shown). In an advertisement example, the advertisement objects may be made available to the advertisement server 112, e.g., via one or more database(s) 114.

The plurality of obtained web objects may be analyzed by a rule based or decision tree system to determine a "goodness" or relevance ranking. For instance, the web objects are ranked in order from most relevant to least relevant based on a plurality of parameter values of the web objects, the user who initiated the search with a search request, etc. At least some of the parameter values have corresponding weight values so that the ranking engine determines relevance of each web object based on differing weights for different parameters. For example, certain parameters may have a higher weight and, accordingly, contribute more to the overall relevance or ranking score of each web document.

The search and advertisement server 112 (or servers) may have access to one or more search and advertisement database(s) 114 into which search and advertisement information is retained. For example, each time a user initiates a search query with one or more search terms and/or performs a search based on such search query, information regarding such search may be retained in the search and advertisement database(s) 114. For instance, the user's search request may contain any number of parameters, such as user or browser identity and the search terms, which may be retained in the search and advertisement database(s) 114. Additional information related to the search, such as a timestamp, may also be retained along with the search request parameters. When results are presented to the user based on the entered search terms, parameters from such search results may also be retained. For example, the specific search results, such as the web sites, the order in which the search results are presented, whether each search result is a sponsored or algorithmic search result, the owner of each search result, whether each search result is clicked by the user, and a timestamp may also be retained in the search and advertisement database(s) 114. The search and advertisement database(s) 114 may also be used to retain similar information regarding advertisement queries and advertisement results. The search and advertisement database(s) 114 may also be used to retain information for optimizing the ranking engine for particular applications as described further below.

The ranking engine may be implemented within the search and advertisement server 112 or on a separate server, such as the illustrated ranking and optimization server 106. When queries are received by the search and advertisement server and web objects located, the ranking server 106 may be adapted to rank such web objects.

The ranking and optimization server 106 may also be adapted to implement optimization techniques for tuning the parameter weight values used by the ranking engine. In specific embodiments of the present invention, a set of optimum parameter weight values for inputting into the ranking engine may be automatically determined. Parameter weights may correspond to any suitable parameter for ranking web objects, such as total term frequency, total term frequencies at specific positions (e.g., body, title, URL, anchor text) in such web object, or the parameters can be any application or system specific parameters that need to be tuned, such as component weights, etc. The ranking and optimization server 106 may also utilize one or more ranking and optimization database(s) 110 for retaining information for ranking and optimization.

Figure 2:
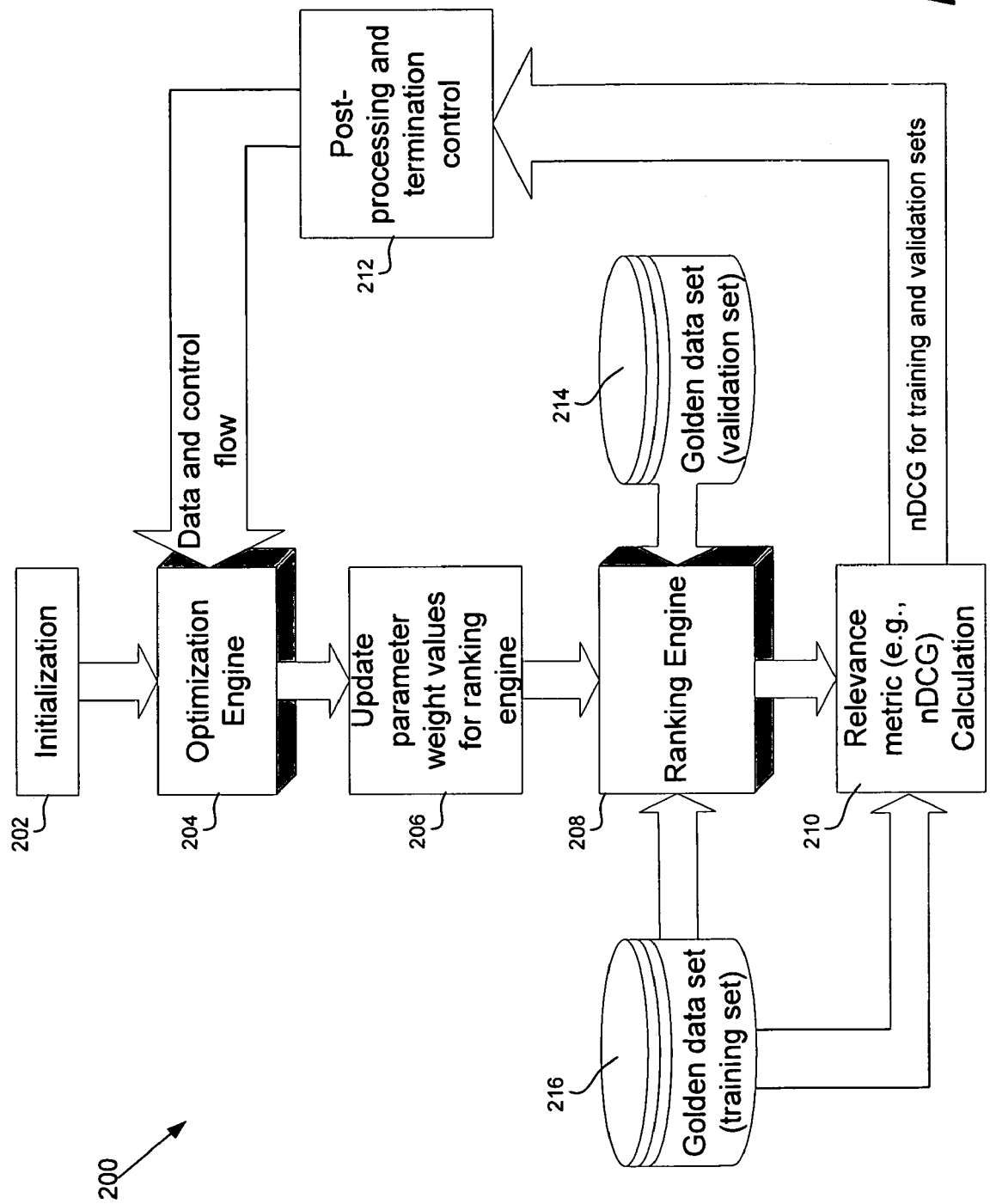
FIG. 2 is a diagrammatic representation of a ranking optimization system in accordance with one embodiment of the present invention.

Regardless of the specific architecture, any suitable mechanism for optimizing parameter weights that are used by a ranking engine may be provided. FIG. 2 is a diagrammatic representation of a ranking optimization system 200 in accordance with one embodiment of the present invention. As shown, the ranking optimization system 200 may include an initialization module 202 for initializing variables to be used by an optimization engine 204 or other components in the optimization system 200. The optimization engine 204 may be adapted to automatically determine a set of trial parameters weight values, which are updated in the ranking engine 208 by update module 206. For each set of trial parameter weight values, the ranking engine 208 determines a set of ranked web objects based on such parameter weight values. The ranking engine 208 may also utilize a "golden" training set 216 to optimize the ranking algorithm, e.g., via an automated learning process. The ranking engine 208 may receive a "golden" validation data set 214 that is used for validating the operation of the ranking engine.

A relevance metric (e.g., nDCG) for the ranked results is then calculated by module 210. The relevance metric calculation module 210 may utilize the training data set 216 and/or the validation data set to determine relevance metrics. In general, a relevance metric may be determined by any suitable manner. One approach is normalized discounted cumulative gain (nDCG). An nDCG metric generally corresponds to the cumulative relevance metrics that have been provided for each ranked web object (e.g., web page or advertisement). A non-normalized DCG metric can be expressed as follows:

$$DCG = \frac{s_1}{\log_2(k_1 + 1)} + \frac{s_2}{\log_2(k_2 + 1)} \ldots$$

where s is a judgment value (e.g., "relevant", "somewhat relevant", or "not relevant" expressed as a score) and k is the ranking score for 1 through m web objects (e.g., web pages or advertisements) with respect to the query input (e.g., search terms or web page). A normalized DCG or nDCG can be expressed as DCG/(ideal_DCG), where the ideal_DCG is the DCG value of an ideal ranking of web objects 1 to m.

Other examples of relevance metrics includes the mean average precision (MAP), the break-even point precision, F measure, and the "F1" variant measure.

The relevance metric is then analyzed to determine whether optimum parameter weight values have been found in a post processing and termination control module 212. If optimum parameter weight values have not been found, the optimization system iteratively continues to find other parameter weight values until the optimum parameter weight values have been found. When optimum parameter weight values have been found, the optimization process can terminate.

Figure 3:
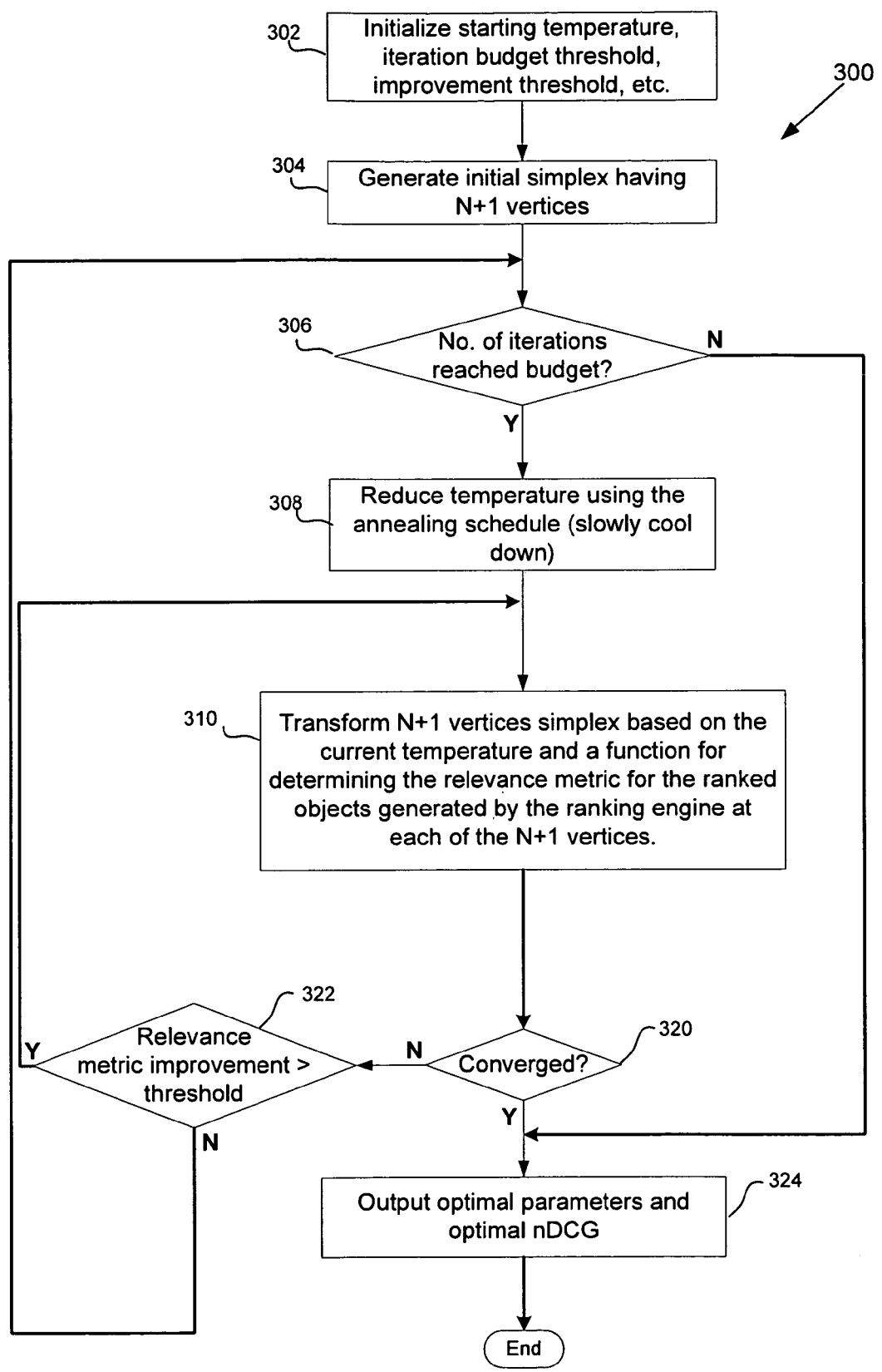
FIG. 3 is a flow chart illustrating a procedure for optimizing a plurality of parameter weight values for a ranking engine in accordance with one embodiment of the present invention.

FIG. 3 is a flow chart illustrating a procedure 300 for optimizing a plurality of parameter weight values for a ranking engine in accordance with one embodiment of the present invention. Initially, a number of variables for use by the optimization and/or ranking processes may be initialized in operation 302. These initialized variables may include a starting temperature, a predefined annealing schedule, an iteration budget, a threshold for the improvement of the relevance metric, etc. These variables and their uses are described further below.

An initial simplex having N+1 vertices may also be generated in operation 304, where N is the number of parameter weight values that are to be optimized. A simplex can be described as a multi-dimensional analogue of a triangle. A simplex can also be described as the convex hull of a set of (N+1) affinely independent points in some Euclidean space of dimension N or higher. For example, a 0-simplex is a point, a 1-simplex is a line segment, a 2-simplex is a triangle, a 3-simplex is a tetrahedron, etc. In one implementation, each of the N+1 vertices corresponds to a trial set of parameter weight values. The initial values of the N+1 vertices may be randomly generated or chosen by a domain expert with a baseline set of parameter values. In a ranking application, each variable that is to be tuned or optimized will correspond to one of the dimensions in the simplex.

An automated iterative process may then be performed on the simplex to generate optimized parameter weights for the ranking engine. Prior to executing the each iteration on the simplex, it may be determined whether the number of iterations has reached the defined predefined iteration budget in operation 306. The iteration budget may be selected based on any suitable criteria, such as past iteration counts for achieving optimum parameter weight, processing resource constraints, etc. The temperature may also be reduced using the predefined annealing schedule in operation 308. The annealing schedule generally defines how much the temperature is reduced for each reduction step. The starting temperature and annealing schedule also may be selected based on any suitable criteria, such as past efficiency and accuracy of starting temperatures and temperature schedules in facilitation of finding optimum weights, etc.

Of course, the temperature may be reduced and/or the iteration budget may be checked at any point in the iterative process. For instance, these operations may be performed after the initial simplex is transformed and evaluated, e.g., after operation 322. That is, the initial temperature may be used for the first iteration and the budget may be evaluated after one or more iteration(s) have been performed.

During the iterative process, the N+1 vertices simplex may be transformed based on the current temperature and a function for determining the relevance metric for the ranked objects generated by the ranking engine at each of the N+1 vertices in operation 310. That is, one or more of the N+1 vertices are adjusted to achieve new parameter weight values at one or more of the N+1 vertices so as to achieve a new simplex with adjusted or "moved" vertices.

A basic Nelder-Mead technique will first be described prior to describing a modification of such basic Nelder-Mead technique that will allow a worse move to be generated using a temperature dependent probability. In general, the basic Nelder-Mead method operates to locate a locally optimal solution to a problem with N variables using a particular objective function. For a ranking engine application, the function calculates a relevance metric for web objects that were ranked by the ranking engine algorithm using a set of parameter weights. The Nelder-Mead method can be used to generate trial sets of parameter weight values for the ranking engine, which generates ranked web objects for which a relevance metric is calculated for each set of parameter weights. The Nelder-Mead technique generates new trial set of parameter weight values or a new vertex by extrapolating the behavior of the objective function as it is applied to the current trial sets of parameter weight values arranged as a simplex. The Nelder-Mead method then replaces one of the current trial sets with a new trial set so that the method progresses with new trial sets of parameter weights.

Figure 4:
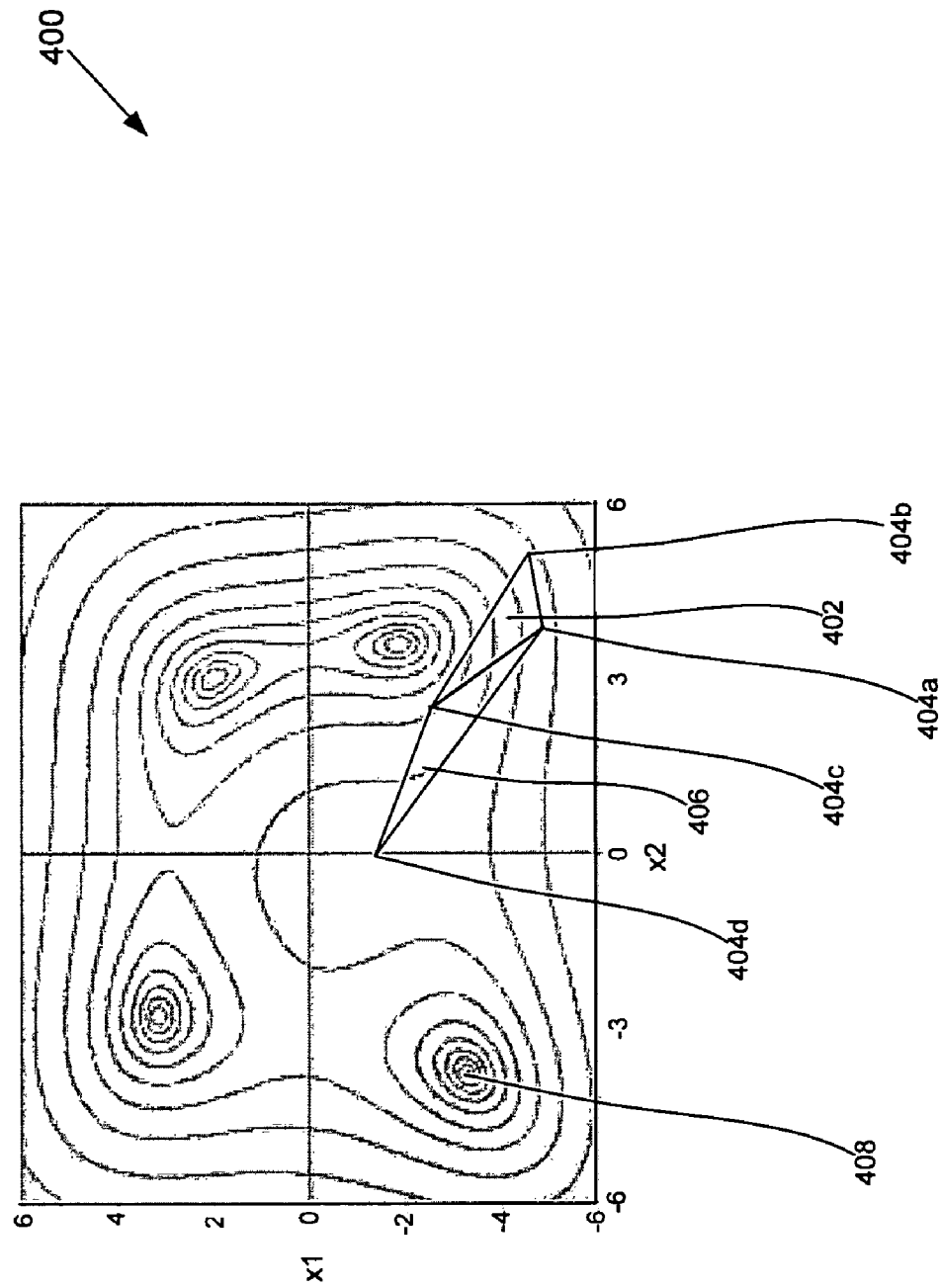
FIG. 4 illustrates a basic Nelder-Mead method applied to a Himmelbau's function and using a 3-vertice simplex.

Embodiments of the present invention may be implemented using any suitable basic Nelder-Mead method variation that is applied to the simplex to locate optimized parameter weight values, wherein such variation depends on the particular application. FIG. 4 illustrates a basic Nelder-Mead method applied to a Himmelbau's function and using a 3-vertice simplex. Each vertex of the simplex correspond to a different trial set of variable values for two variables x1 and x2. The optimized function may correspond to a minimum or maximum optimized location. In this example, the optimum location corresponds to a local minimum point.

When the Nelder-Mead method is performed on the 3-vertice simplex or triangle, such triangle moves across the function space until a local minimum is achieved. Of course, the goal may be to achieve a local maximum, instead of a minimum. Regardless, the goal would be to achieve a local optimized value. As shown, a first triangle 402 may initially include vertices 404a, 404b, and 404c, which correspond to three different trial sets of x1 and x2 values. Relative values of the Himmelbau's function applied to different x1 and x2 values are represented by a contour map.

In each iteration, the Nelder-Mead method moves one vertex of the simplex so as to attain a new set of x1 and x2 values and resulting function value. As shown, the simplex 402 is transformed into a new simplex 406 having new vertex 404d while retaining vertices 404a and 404c. The Nelder-Mead method continues to transform the simplex (not shown) until the vertices converge to a local minimum 408 for Himmelbau's function. In the illustrated example, local minimum is reached for an x1 value equal to about −3.5 and an x2 value equal to about −4.

One possible variation of the Nelder-Mead algorithm can be described as follows:

1. First calculate the function value at each vertex and then order the vertices according to the calculated values, e.g., from best to worst function value:

$$f(x_1) \leq f(x_2) \leq \ldots \leq f(x_{n+1})$$

2. A reflection may be calculated as follows: $x_r = x_o + \alpha(x_o - x_{n+1})$, where $x_o$ is the center of gravity of all points except $x_{n+1}$.
If $f(x_1) \leq f(x_r) < f(x_n)$, then a new simplex is formed with $x_r$ and by rejecting $x_{n+1}$. The procedure returns to step 1.

3. An expansion operation may be performed based on the following:

If $f(x_r) < f(x_1)$, then compute $x_e = x_o + \gamma(x_o - x_{n+1})$.
If $f(x_e) < f(x_r)$, compute new simplex with $x_e$ and by rejecting $x_{n+1}$ and the process returns to step 1. Otherwise, a new simplex is computed with $x_r$ and by rejecting $x_{n+1}$ and the procedure returns to step 1.

4. A contraction operation may be performed by the following:

If $f(x_r) \geq f(x_n)$, then compute $x_c = x_{n+1} + \rho(x_o - x_{n+1})$.
If $f(x_c) \leq f(x_{n+1})$, a new simplex may be computed with $x_c$ and by rejecting $x_{n+1}$, and process then returns to step 1. Otherwise, the procedure goes to step 5.

5. A shrink operation may be performed by the following:
Compute the n vertices evaluations:
$x_i = x_1 + \rho(x_i - x_1)$ for all $i \in \{2, \ldots n+1\}$ and return to step 1.

The $\alpha, \rho, \gamma$ and $\sigma$ constants are respectively the reflection, the expansion, the contraction and the shrink coefficient. Standard value such as $\alpha = 1, \gamma = 2, \rho = \frac{1}{2}$ and $\sigma = \frac{1}{2}$ may be used. Other suitable values may be used.

In one implementation of a modified Nelder-Mead technique, a positive, logarithmically distributed random variable, proportional to the simulated annealing temperature, T, may be added to the stored function value associated with every vertex of the simplex, and a similar random variable may be subtracted from the function value of every new point that is tried as a replacement point. This modified Nelder-Mead method may be adapted to accept a true downhill step (better move) for most moves, but sometimes will accept an uphill one (worse move). In the temperature approaches zero (e.g., according to the simulated annealing schedule), this modified Nelder-Mead method reduces exactly to the basic Nelder-Mead method and converges to a local minimum or local "best" point.

Other iterative processes for determining optimum values for a plurality of parameters may be modified to practice techniques of the present invention. Additionally or alternatively, other processes, besides a simulated annealing method, may be integrated with such iterative process to find optimum values by utilizing one or more sets of weight values that result in a worst relevance metric value as compared to a previous set of weight values in order to locate the optimized level. For example, a genetic algorithm may be used instead of a simulated annealing method. Additionally, the trial parameter sets may be represented by any suitable data structure, as opposed to a simplex.

Regardless of whether a next move corresponds to a higher or lower function value (or relevance metric value) using the modified Nelder-Mead method or another transformation technique, it may then be determined whether the simplex has converged in operation 320. If the simplex has converged, the optimal parameter weight values and optimal relevance metric are output in operation 324 and the procedure ends.

If the simplex has not converged, it may be determined whether the improvement in the relevance metric, as compared to the previous simplex, has improved by the predefined threshold in operation 322. If the improvement is greater than the relevance metric threshold, the procedure returns to operation 310 in which another transformation is performed on the simplex at the current temperature. For example, the modified Nelder-Mead method is iteratively performed on each new vertex position based on the current temperature until a predefined relevance improvement threshold is no longer achieved. When the improvement falls below the improvement threshold, the procedure returns to operation 306 so as to determine whether the number of moves has reached the predefined budget threshold in operation 306, and the temperature is reduced using the annealing schedule in operation 308 if the budget has not been reached.

Reducing the temperature reduces the probability of taking worse moves. The improvement threshold may be selected based on any suitable factors, e.g., selecting a threshold based on past efficiency and/or accuracy of finding optimum weights, or an application dependent threshold chosen by domain experts, etc.

Figure 5:
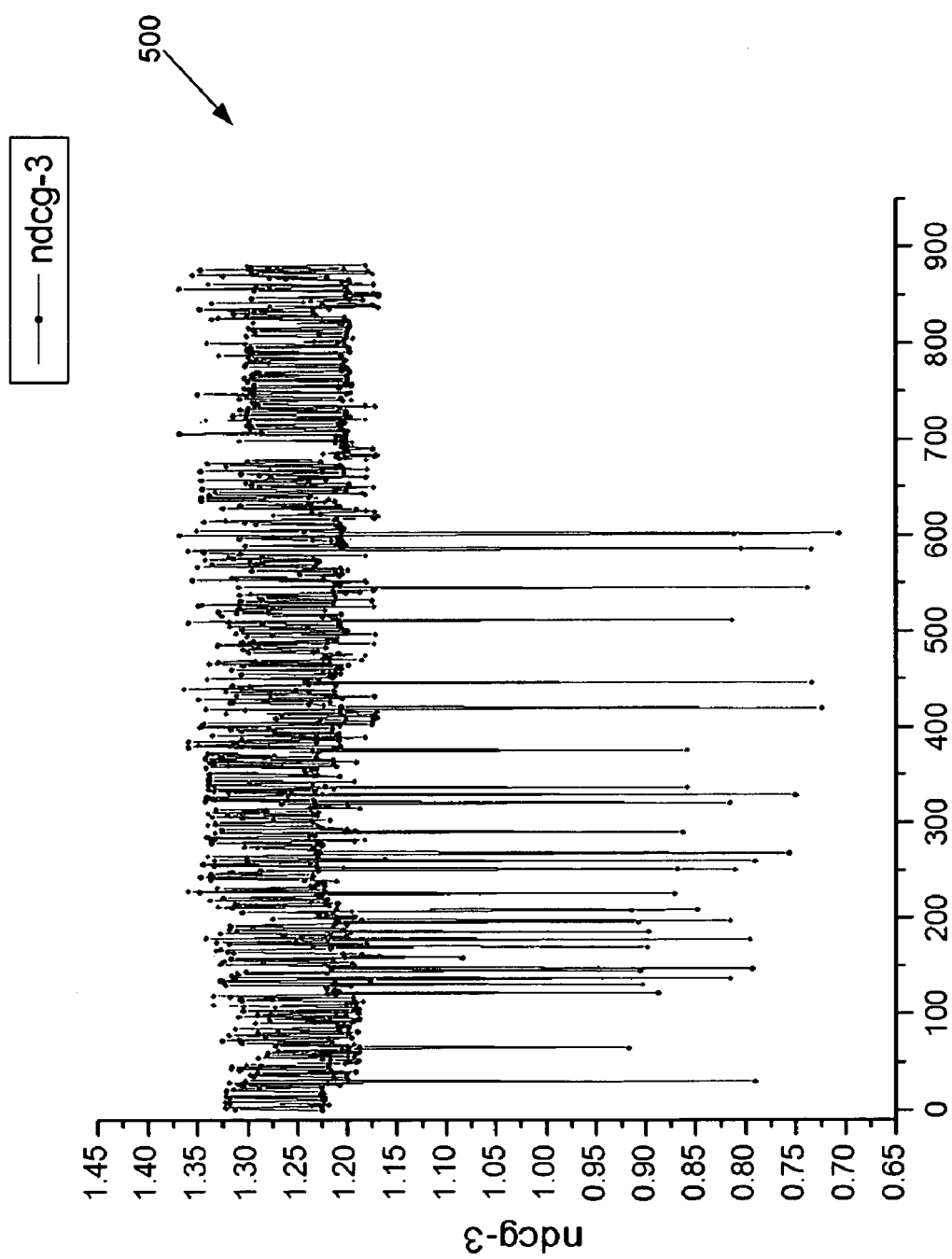
FIG. 5 is a graph of best nDCG values for each simplex as generated by a modified Nelder-Mead method in accordance with one implementation of the present invention.

Embodiments of the present invention tend to facilitate finding optimized parameter weight values while minimizing the likelihood of merely achieving a local simplex convergence position, which corresponds to a non-optimum set of parameter weight values. FIG. 5 is a graph of best nDCG values for each simplex as generated by a modified Nelder-Mead method in accordance with one implementation of the present invention. As shown, worst moves are more likely to be taken by the modified Nelder-Mead method when the number of iterations is low (and corresponding temperature is high). These earlier investigations may result in finding other local best (local maximum) positions or nDCG values, which may be better than initially located local best positions. As the number of iterations increases (and the corresponding temperature becomes lower or approaches zero), the frequency of worst nDCG values likewise decreases.

Figure 6:
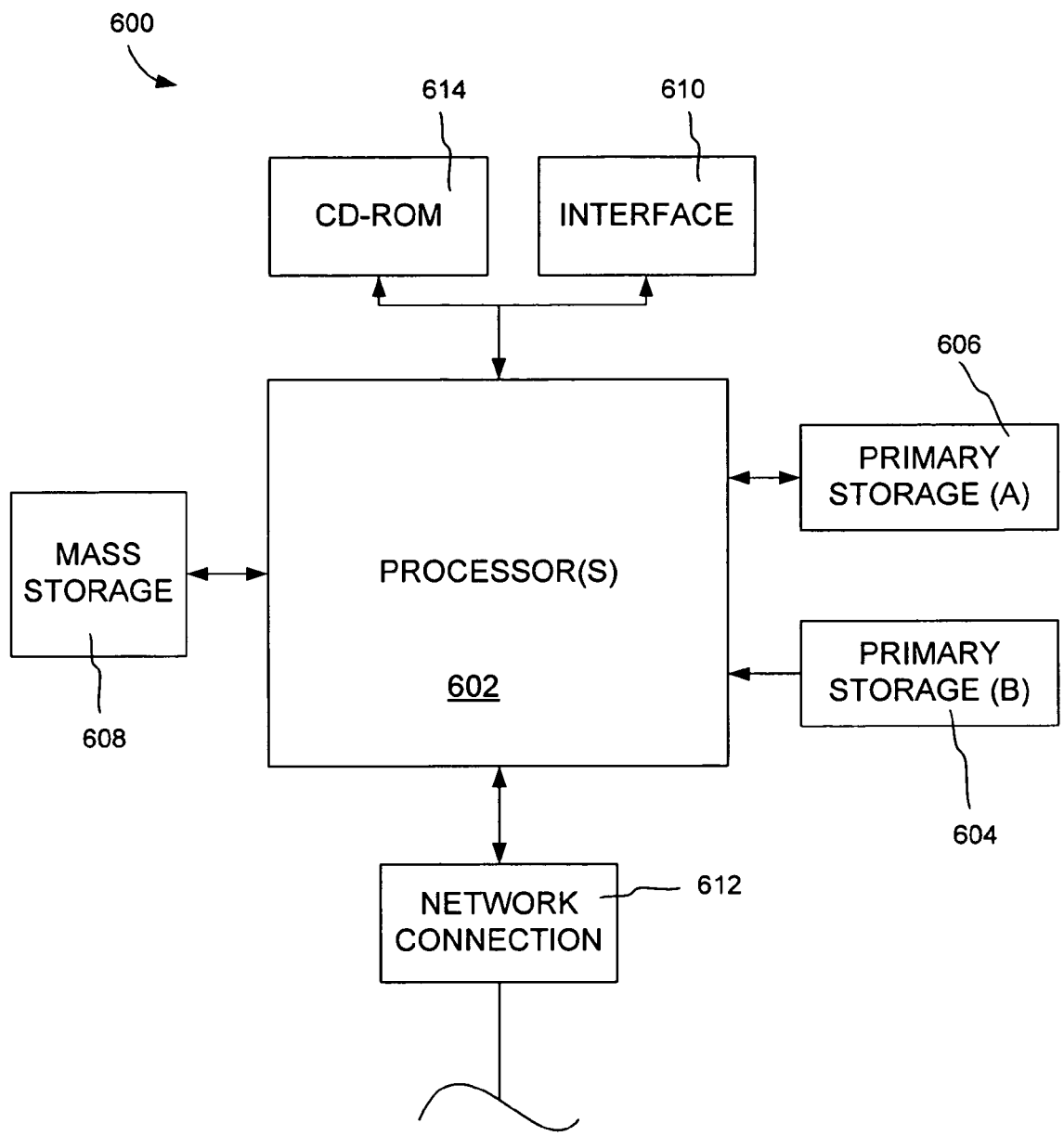
FIG. 6 illustrates an example computer system in which specific embodiments of the present invention may be implemented.

FIG. 6 illustrates a typical computer system that, when appropriately configured or designed, can serve as an optimization system. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general-purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described herein. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store parameter weight values, relevance metric values, improvement values, simplex data, an iteration budget threshold, an initial and current temperature value, an annealing schedule, a relevance metric improvement threshold, optimum parameter weight values, a corresponding optimum relevance metric, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:
1. A method for facilitating the ranking of a plurality of web objects, comprising:
automatically adjusting a plurality of weight values for a plurality of parameters for inputting into a ranking engine that is adapted to rank a plurality of web objects based on such weight values and their corresponding parameters;

providing the adjusted weight values to the ranking engine so as to generate a ranked set of web objects based on such adjusted weight values and their corresponding parameters, as well as a particular query;

determining a relevance metric that quantifies or qualifies how relevant the generated ranked set of web objects are for the particular query; and automatically repeating the operations of adjusting the weight values, providing the adjusted weight values to the ranking engine, and determining a relevance metric until the relevance metric reaches an optimized level, which corresponds to an optimized set of weight values, and wherein the repeated operations utilize one or more sets of weight values including at least one set that results in a worst relevance metric value, as compared to a previous set of weight values, according to a certain probability in order to escape a local optimal solution to reach a global optimal solution, wherein the operation of automatically repeating the operations for adjusting the weights, providing the adjusted weight values, and determining a relevance metric is accomplished by:

generating a N+1 vertex data structure, wherein N corresponds to the number of parameters for which weight values are to be adjusted; and transforming the data structure by a reflecting, expanding, and/or contracting operation on one or more vertices of the data structure whereby the transformed data structure's resulting vertices correspond to the adjusted weight values that are provided to the ranking engine, and wherein the transforming of the data structure is dependent on a variable temperature, which decreases for one or more transformation operations based on a simulated annealing technique, so that the probability that the adjusted weight values results in a lower relevance metric is inversely proportional to a current temperature value of the variable temperature.

2. The method as recited in claim 1, wherein the data structure is in the form of a simplex.

3. The method as recited in claim 2, wherein the transforming operation is performed by a modified Nelder-Mead technique that includes a positive, logarithmically distributed random variable, proportional to the current temperature value, within each stored function value that is associated with each vertex of the simplex, and a similar random variable that is subtracted from the function value of every new point of the simplex.

4. The method as recited in claim 1, wherein the query includes one or more keywords and the ranking engine is adapted to locate web objects that are most relevantly associated with such keywords.

5. The method as recited in claim 1, wherein the query includes a web page and the ranking engine is adapted to locate web objects in the form of advertisement objects that are most relevantly associated with such web page.

6. The method as recited in claim 1, wherein the relevance metric is a normalized discounted cumulated gain (nDCG) value or a mean average precision (MAP) value.

7. An apparatus comprising at least a processor and a memory, wherein the processor and/or memory are configured to perform the following operations:

automatically adjusting a plurality of weight values for a plurality of parameters for inputting into a ranking engine that is adapted to rank a plurality of web objects based on such weight values and their corresponding parameters;

providing the adjusted weight values to the ranking engine so as to generate a ranked set of web objects based on such adjusted weight values and their corresponding parameters, as well as a particular query;

determining a relevance metric that quantifies or qualifies how relevant the generated ranked set of web objects are for the particular query; and automatically repeating the operations of adjusting the weight values, providing the adjusted weight values to the ranking engine, and determining a relevance metric until the relevance metric reaches an optimized level, which corresponds to an optimized set of weight values, and wherein the repeated operations utilize one or more sets of weight values including at least one set that results in a worst relevance metric value, as compared to a previous set of weight values, according to a certain probability in order to escape a local optimal solution to reach a global optimal solution, wherein the operation of automatically repeating the operations for adjusting the weights, providing the adjusted weight values, and determining a relevance metric is accomplished by:

generating a N+1 vertex data structure, wherein N corresponds to the number of parameters for which weight values are to be adjusted; and transforming the data structure by a reflecting, expanding, and/or contracting operation on one or more vertices of the data structure whereby the transformed data structure's resulting vertices correspond to the adjusted weight values that are provided to the ranking engine, and wherein the transforming of the data structure is dependent on a variable temperature, which decreases for one or more transformation operations based on a simulated annealing technique, so that the probability that the adjusted weight values results in a lower relevance metric is inversely proportional to a current temperature value of the variable temperature.

8. The apparatus as recited in claim 7, wherein the data structure is in the form of a simplex.

9. The apparatus as recited in claim 8, wherein the transforming operation is performed by a modified Nelder-Mead technique that includes a positive, logarithmically distributed random variable, proportional to the current temperature value, within each stored function value that is associated with each vertex of the simplex, and a similar random variable that is subtracted from the function value of every new point of the simplex.

10. The apparatus as recited in claim 7, wherein the query includes one or more keywords and the ranking engine is adapted to locate web objects that are most relevantly associated with such keywords.

11. The apparatus as recited in claim 7, wherein the query includes a web page and the ranking engine is adapted to locate web objects in the form of advertisement objects that are most relevantly associated with such web page.

12. The apparatus as recited in claim 7, wherein the relevance metric is a normalized discounted cumulated gain (nDCG) value or a mean average precision (MAP) value.

13. At least one computer readable storage medium having computer program instructions stored thereon that are arranged to perform the following operations:

automatically adjusting a plurality of weight values for a plurality of parameters for inputting into a ranking engine that is adapted to rank a plurality of web objects based on such weight values and their corresponding parameters;

providing the adjusted weight values to the ranking engine so as to generate a ranked set of web objects based on such adjusted weight values and their corresponding parameters, as well as a particular query;

determining a relevance metric that quantifies or qualifies how relevant the generated ranked set of web objects are for the particular query; and automatically repeating the operations of adjusting the weight values, providing the adjusted weight values to the ranking engine, and determining a relevance metric until the relevance metric reaches an optimized level, which corresponds to an optimized set of weight values, and wherein the repeated operations utilize one or more sets of weight values including at least one set that results in a worst relevance metric value, as compared to a previous set of weight values, according to a certain probability in order to escape a local optimal solution to reach a global optimal solution, wherein the operation of automatically repeating the operations for adjusting the weights, providing the adjusted weight values, and determining a relevance metric is accomplished by:

generating a N+1 vertex data structure, wherein N corresponds to the number of parameters for which weight values are to be adjusted; and transforming the data structure by a reflecting, expanding, and/or contracting operation on one or more vertices of the data structure whereby the transformed data structure's resulting vertices correspond to the adjusted weight values that are provided to the ranking engine, and wherein the transforming of the data structure is dependent on a variable temperature, which decreases for one or more transformation operations based on a simulated annealing technique, so that the probability that the adjusted weight values results in a lower relevance metric is inversely proportional to a current temperature value of the variable temperature.

14. The least one computer readable storage medium as recited in claim 13, wherein the data structure is in the form of a simplex.

15. The least one computer readable storage medium as recited in claim 14, wherein the transforming operation is performed by a modified Nelder-Mead technique that includes a positive, logarithmically distributed random variable, proportional to the current temperature value, within each stored function value that is associated with each vertex of the simplex, and a similar random variable that is subtracted from the function value of every new point of the simplex.

16. The least one computer readable storage medium as recited in claim 13, wherein the query includes one or more keywords and the ranking engine is adapted to locate web objects that are most relevantly associated with such keywords.

17. The least one computer readable storage medium as recited in claim 13, wherein the query includes a web page and the ranking engine is adapted to locate web objects in the form of advertisement objects that are most relevantly associated with such web page.

18. The least one computer readable storage medium as recited in claim 13, wherein the relevance metric is a normalized discounted cumulated gain (nDCG) value or a mean average precision (MAP) value.

* * * * *